(12) United States Patent
Valascho et al.

(10) Patent No.: US 7,659,809 B2
(45) Date of Patent: Feb. 9, 2010

(54) SYSTEM AND METHOD FOR ALERTING A DRIVER OF A HYBRID ELECTRIC VEHICLE THAT THE VEHICLE IS IN A DRIVE STATE

(75) Inventors: Joseph Francis Valascho, Utica, MI (US); Michael L. Gusta, Northville, MI (US); Raymond C. Siciak, Ann Arbor, MI (US); Dino H. Candela, Northville, MI (US); Jamala Kianga Massenburg, Melvindale, MI (US); Robert Lewis Humphrey, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 381 days.

(21) Appl. No.: 11/778,137

(22) Filed: Jul. 16, 2007

(65) Prior Publication Data

US 2009/0021360 A1 Jan. 22, 2009

(51) Int. Cl.
*B60Q 1/00* (2006.01)

(52) U.S. Cl. .............. 340/438; 340/425.5; 340/439; 340/441; 340/457; 340/691.1; 340/692; 340/691.7; 180/286; 180/289; 903/906

(58) Field of Classification Search ............. 340/425.5, 340/439, 438, 441, 457, 691.1, 692, 691.7; 180/286, 289; 903/906
See application file for complete search history.

(56) References Cited

U.S. PATENT DOCUMENTS

| 6,358,180 B1 | 3/2002 | Kuroda et al. |
| 6,739,418 B2 | 5/2004 | Ogata et al. |
| 6,758,788 B2 | 7/2004 | Itou |
| 7,127,337 B2 | 10/2006 | Bennett et al. |

*Primary Examiner*—Benjamin C Lee
*Assistant Examiner*—Ojiako Nwugo
(74) *Attorney, Agent, or Firm*—David B. Kelley; Brooks Kushman P.C.

(57) ABSTRACT

An engine of a hybrid electric vehicle is started following a determination that the vehicle is not moving, the ignition system is in a run state, a door is open, and the engine is not running to alert a driver that the vehicle is in a drive state.

6 Claims, 2 Drawing Sheets

|   | Speed < 3 MPH | IGN in RUN | Door Open | ICE Off |
|---|---|---|---|---|
| 36 — Door-Ajar Chime | N | Y | Y | Y |
| 38 — Key-in-IGN Chime | Y | N | Y | Y |
| 40 — No Chime | Y | Y | N | Y |
| 42 — Door-Ajar Chime | Y | Y | Y | N |
| 44 — No Chime | Y | Y | N | N |
| 46 — No Chime | Y | N | N | Y |
| 48 — Door-Ajar Chime | N | Y | Y | N |
| 50 — No Chime | N | Y | N | Y |
| 52 — No Chime | N | Y | N | N |
| 54 — ECM Runs ICE for Approx. 5 sec. | Y | Y | Y | Y |

Fig-2

SYSTEM AND METHOD FOR ALERTING A DRIVER OF A HYBRID ELECTRIC VEHICLE THAT THE VEHICLE IS IN A DRIVE STATE

BACKGROUND OF THE INVENTION

1. Field of the Invention

The invention relates to systems and methods for alerting a driver of a hybrid electric vehicle that the vehicle is in a drive state.

2. Discussion

When a key is left in an ignition in the OFF or ACCESSORY positions of a conventional vehicle, and a door is opened, a chime may be activated. If, however, the key is in the RUN position when the door is opened, the engine may also be heard and/or felt. Hearing the engine running may be a definitive reminder that the key was left in the RUN position.

SUMMARY

Embodiments of the invention may take the form of a method for alerting a driver of a hybrid electric vehicle having an engine and a door that the vehicle is in a drive state. The method includes determining whether the engine is running and determining whether the door is open. The method also includes running the engine following a determination that the door is open and that the engine is not running.

Embodiments of the invention may take the form of a method for alerting a driver of a hybrid electric vehicle including an ignition system having a run state, an engine, and a door that the vehicle is in a drive state. The method includes determining whether the ignition system is in the run state and determining whether the door is open. The method also includes running the engine following a determination that the door is open and that the ignition system is in the run state.

BRIEF DESCRIPTION OF THE DRAWINGS

FIG. 2 is a tabular representation of control logic employed by the control module of FIG. 1 when determining whether to alert the driver that the vehicle is in the drive state.

DETAILED DESCRIPTION

Figure 1:
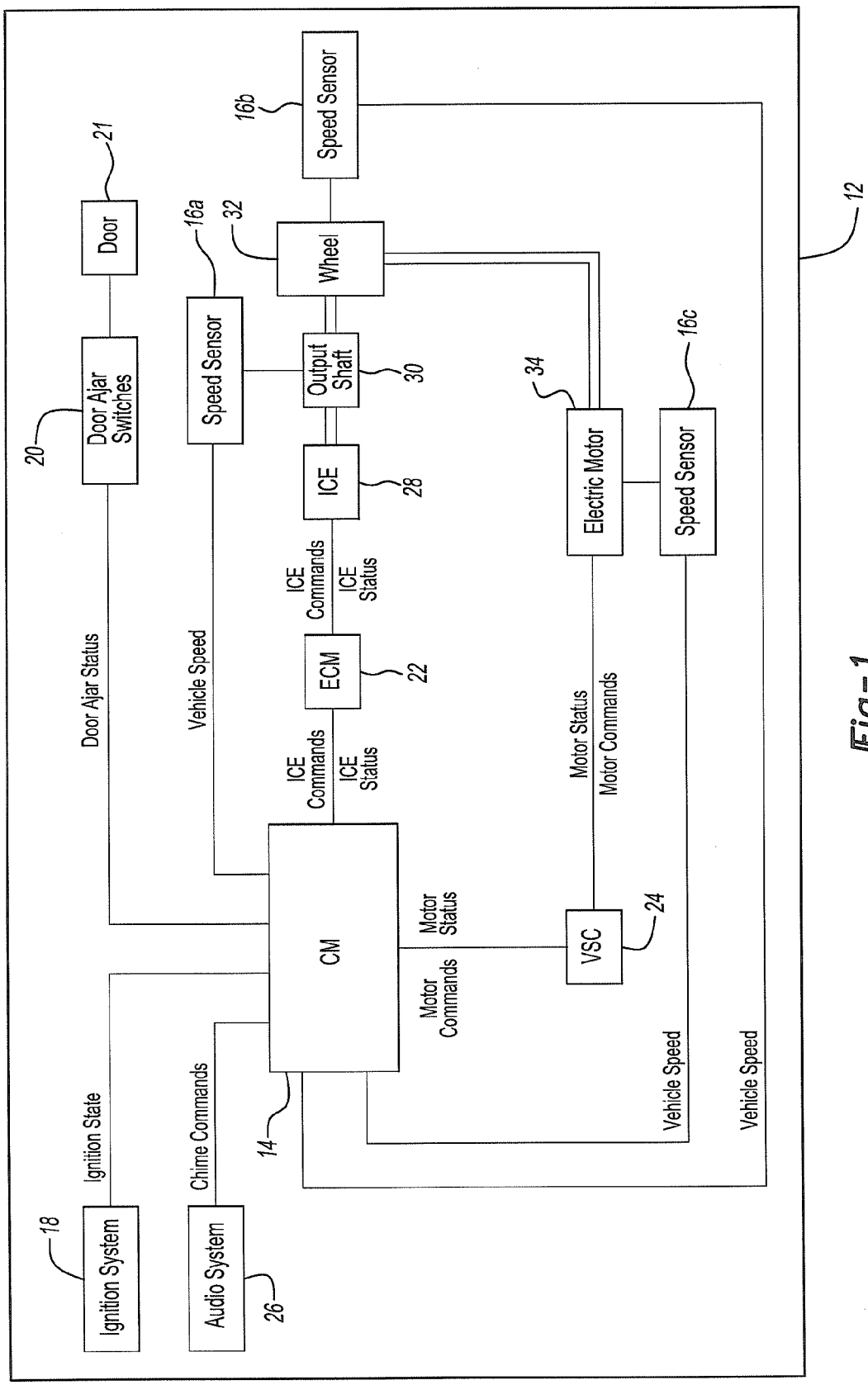
FIG. 1 is a block diagram of a system for alerting a driver of a vehicle that the vehicle is in a drive state in accordance with an embodiment of the invention and shows a control module in communication with, inter alia, speed sensors, an ignition system, door ajar switches, and an engine control module.

In a Hybrid Electric Vehicle (HEV), if an ignition system is in a run state, e.g., a key is in the RUN position, an engine is off, and a door is opened, a driver may not be aware that the ignition system is in the run state, and thus that the vehicle is in a drive state, because the engine is not heard and/or felt.

Embodiments of the invention may provide control logic such that if an ignition system of a vehicle including an engine is in a run state when any door is opened, and the vehicle is not moving, the engine will be started or run for three to five seconds. Starting the engine under such conditions will provide the driver and any passengers with sensory inputs to alert them that the ignition system was left in the run state. This sensory feedback from the running engine may be provided in addition to Door-Ajar chimes that may also be activated.

FIG. 1 is a block diagram of system 10 for alerting a driver of vehicle 12 that vehicle 12 is in a drive state. Control module (CM) 14 communicates with speed sensors 16a, 16b, 16c, ignition system 18, door ajar switches 20, engine control module (ECM) 22, vehicle system controller (VSC) 24, and audio system 26. CM 14 receives vehicle speed information from speed sensors 16a, 16b, 16c, ignition state information from ignition system 18, door ajar status information, regarding door 21, from door ajar switches 20, and ICE status information from ECM 22. As explained below, based on this information, CM 14 may issue various alerts, e.g., ICE commands to ECM 22, chime commands to audio system 26, for the driver regarding the status of vehicle 12.

ECM 22 communicates with internal combustion engine (ICE) 28. ECM 22 receives ICE status information from ICE 28 and issues ICE commands to ICE 28. ICE status information includes information regarding whether ICE 28 is running. ICE commands may include ICE start/stop commands. ICE start/stop commands may originate from CM 14 based on information from speed sensors 16a, 16b, 16c, ignition system 18, door ajar switches 20, and ECM 22.

ICE 28 is mechanically connected with output shaft 30. Speed sensor 16a senses the speed of output shaft 30 and communicates that information to CM 14. Output shaft 30 is mechanically connected with wheel 32. Speed sensor 16b senses the speed of wheel 32 and communicates that information to CM 14.

VSC 24 communicates with electric motor 34. VSC 24 receives motor status information from electric motor 34 and issues motor commands to electric motor 34. Motor commands may originate from CM 14.

Electric motor 34 is mechanically connected with wheel 32. Speed sensor 16c senses the speed of electric motor 34 and communicates that information to CM 14.

In the embodiment of FIG. 1, the various components communicate via a controller area network (CAN). In some alternative embodiments, the various components may communicate via hard wire or via a combination of hard wire and CAN. In other alternative embodiments, some of the various components may communicate via wireless.

FIG. 2 is a tabular representation of control logic employed by CM 14 when determining whether to alert the driver that vehicle 12 is in the drive state. At 36, if vehicle speed is greater than a threshold, e.g., 3 m.p.h, ignition system 18 is in run, door 21 is open, and ICE 28 is off, CM 14 issues a door ajar chime command to audio system 26. At 38, if vehicle speed is less than the threshold, ignition system 18 is not in run, door 21 is open, and ICE 28 is off, CM 14 issues a key in ignition chime command to audio system 26. At 40, if vehicle speed is less than the threshold, ignition system 18 is in run, door 21 is closed, and ICE 28 is off, CM 14 does not issue a chime command to audio system 26. At 42, if vehicle speed is less than the threshold, ignition system 18 is in run, door 21 is open, and ICE 28 is on, CM 14 issues a door ajar chime command to audio system 26. At 44, if vehicle speed is less than the threshold, ignition system 18 is in run, door 21 is closed, and ICE 28 is on, CM 14 does not issue a chime command to audio system 26. At 46, if vehicle speed is less than the threshold, ignition system 18 is not in run, door 21 is closed, and ICE 28 is off, CM 14 does not issues a chime command to audio system 26. At 48, if vehicle speed is greater than the threshold, ignition system 18 is in run, door 21 is open, and ICE 28 is on, CM 14 issues a door ajar chime command to audio system 26. At 50, if vehicle speed is greater than the threshold, ignition system 18 is in run, door 21 is closed, and ICE 28 is off, CM 14 does not issue a chime command to audio system 26. At 52, if vehicle speed is greater than the threshold, ignition system 18 is in run, door 21 is closed, and ICE 28 is on, CM 14 does not issue a chime command to audio system 26. At 54, if vehicle speed is less than the threshold, ignition system 18 is in run, door 21 is open, and ICE 28 is off, CM 14 issues ICE commands to ECM 22 such that ECM 22 runs ICE 28 for a period of time, e.g., 5 seconds, so as to alert the driver that vehicle 12 is in the drive state.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for alerting a driver of a hybrid electric vehicle having an engine, door and ignition that the vehicle is in a drive state, the method comprising:
    determining whether the engine is running;
    determining whether the door is open;
    determining whether the ignition is in a run state;
    determining whether vehicle speed is less than a predefined threshold; and
    running the engine following a determination that the door is open, the engine is not running, the ignition is in the run state, and the vehicle speed is less than the predefined threshold to alert the driver.

2. The method of claim 1 wherein the engine is run for a predetermined period of time.

3. A method for alerting a driver of a hybrid electric vehicle including an engine, door and ignition comprising:
    determining whether the ignition is in a run state;
    determining whether the engine is off;
    determining whether the vehicle is moving;
    determining whether the door is open; and
    running the engine if the ignition is in the run state, the engine is off, the door is open and the vehicle is not moving to alert the driver.

4. The method of claim 3 wherein the engine is run for a predetermined period of time.

5. A hybrid electric vehicle comprising:
    an ignition;
    an engine;
    a door; and
    at least one controller configured to determine if the ignition is in a run state, determine if the engine is off, determine if the door is open, determine if the vehicle is moving, and run the engine if the ignition is in the run state, the engine is off, the door is open, and the vehicle is not moving to alert a driver.

6. The vehicle of claim 5 wherein the at least one controller is further configured to run the engine for a predetermined period of time.

* * * * *